(12) United States Patent
Karnalkar et al.

(10) Patent No.: US 8,355,488 B2
(45) Date of Patent: *Jan. 15, 2013

(54) METHOD AND SYSTEM FOR DETERMINING AUTHORIZATION LEVELS IN A VIRTUAL PRIVATE NETWORK (VPN)

(75) Inventors: Anup D. Karnalkar, Allen, TX (US); Michael E. Redman, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 318 days.

This patent is subject to a terminal disclaimer.

(21) Appl. No.: 12/872,639

(22) Filed: Aug. 31, 2010

(65) Prior Publication Data

US 2010/0329439 A1 Dec. 30, 2010

Related U.S. Application Data

(63) Continuation of application No. 11/461,967, filed on Aug. 2, 2006, now Pat. No. 7,809,123.

(51) Int. Cl.
*H04M 1/66* (2006.01)
*H04M 7/00* (2006.01)
(52) U.S. Cl. .............. 379/200; 379/221.03; 379/221.08
(58) Field of Classification Search .................. 379/200, 379/221.03, 221.06, 221.08
See application file for complete search history.

(56) References Cited

U.S. PATENT DOCUMENTS

| | | | |
|---|---|---|---|
| 6,393,112 B1 | 5/2002 | Gottlieb et al. | |
| 6,442,547 B1 | 8/2002 | Bowman-Amuah | |
| 6,614,781 B1 | 9/2003 | Elliott et al. | |
| 6,724,874 B2 | 4/2004 | Fleischer et al. | |
| 2002/0136370 A1 | 9/2002 | Gallant | |
| 2004/0022237 A1 | 2/2004 | Elliott et al. | |
| 2004/0170269 A1 | 9/2004 | Madoch et al. | |
| 2007/0217408 A1* | 9/2007 | Sahashi et al. | 370/389 |
| 2008/0031196 A1 | 2/2008 | Marathe et al. | |
| 2008/0043754 A1 | 2/2008 | Karnalkar et al. | |

OTHER PUBLICATIONS

United States Patent and Trademark, "Office Action" issued in connection with U.S. Appl. No. 11/461,967, mailed Apr. 1, 2010 (20 pages).
United States Patent and Trademark, "Notice of Allowance" issued in connection with U.S. Appl. No. 11/461,967, mailed Aug. 5, 2010 (11 pages).

* cited by examiner

*Primary Examiner* — Ahmad Matar
*Assistant Examiner* — Oleg Asanbayev
(74) *Attorney, Agent, or Firm* — Hanley, Flight & Zimmerman, LLC

(57) ABSTRACT

Example methods, apparatus and articles of manufacture to determine authorization levels in a virtual private network are disclosed. A disclosed example method includes determining whether a call originated from an originating station associated with a virtual private network, the call originating via a private branch exchange associated with the virtual private network by a first user of a plurality of users associated with the virtual private network, querying a private-number table based on at least one of a switch identifier representing a service switching point, a trunk group identifier representing the private branch exchange, or an originating station identifier representing the originating station to obtain a private number assigned to the first user, and providing an authorization level associated with the private number to the service switching point, the service switching point to process the call according to the authorization level.

12 Claims, 4 Drawing Sheets

METHOD AND SYSTEM FOR DETERMINING AUTHORIZATION LEVELS IN A VIRTUAL PRIVATE NETWORK (VPN)

RELATED APPLICATION

This patent arises from a continuation of U.S. application Ser. No. 11/461,967, entitled "Method and System for Determining Independent Authorization Levels in a VPN", which was filed on Aug. 2, 2006 and is hereby incorporated herein by reference in its entirety.

FIELD OF THE DISCLOSURE

The present invention relates to the authorization levels for telephone calls, and more particularly to assigning an authorization level to an originating station in a primary rate interface for a virtual private network.

BACKGROUND

Phone networks for large organizations and businesses are generally designed to accommodate the structure of the organization. In many phone systems provided to such business operations, multiple telephone receivers, or originating stations, connect to a PBX (Private Branch Exchange). A PBX is a telephone switching center that is owned by a private business. The PBX provides an interface over an ISDN line (Integrated Services Digital Network) to an Inter-exchange Carrier Service Switching Point (IXC SSP, or SSP). ISDN permits voice, data, text, graphics, music, video, and other source material to be transmitted over existing telephone wires. ISDN generally provides two levels of service: a Basic Rate Interface (BRI) which is an interface from the Service Switching Point (SSP) in the local exchange node or a Central Office, intended for the home and small enterprises, and a Primary Rate Interface (PRI) which is an interface from the Service Switching Point (SSP) or the local exchange node/Central Office and could also be an interface from the IXC SSP, for larger users.

Both rates include a number of B-channels for carrying data, voice, and other services, and D-channels for carrying control and signaling information. The Inter-exchange Carrier Service Switching Point (IXC SSP) is the Long Distance switching node in a telephone network. The IXC SSP communicates with the Public Switched System Telephone Network (PSTN) telephone system based on copper wires carrying voice generally over a Feature Group D (FGD) connection. Feature Group D is a type of telecommunication trunk used to provide "equal access" capability from telecommunication carriers and central offices (where the switching equipment is located and customer lines are connected and terminated) to the access tandem. In addition to communicating with the PSTN, the IXC SSP sends messages to a "Service Control Point" (SCP) to query databases about subscriber service information and routing information of a subscriber telephone call.

A virtual private network (VPN) is a method devised to use a public telecommunication infrastructure, including the Internet, to provide remote offices or individual users with secure access to their organization's virtual network. A VPN works by using the carrier's shared infrastructure while maintaining privacy through various security and dialing procedures. Large organizations often provide a hierarchical authorization structure. Some current methods enable transfer of the authorization structure to a phone connection system for the organization. Currently, authorization levels are assigned at the PBX level, which means that originating stations that share the same PBX are assigned the same level of authorization.

When a call is made at an originating station hosted by a PBX, a Trunk Group Number (TGN) identifying the PBX and a Switch ID (SwID) identifying the SSP are used to determine an authorization level. For example, the TGN and SwID values can be used to query a database of authorization levels. Access tables have been used to determine the membership of a Dedicated Access Line (DAL) in a VPN customized plan. In this case, two existing values (e.g. DAL and ISDN) differentiate a 'plain' DAL from a Primary Rate Interface (PRI) DAL, respectively. The Access Table identifies the type of DAL being used and assigns a DAL-level private number to the call. In another table, the DAL-level private number is associated to an Authorization Level that is applied to all customer stations connected to long-distance (LD) using that DAL.

Known authorization systems have operated under the assumption that stations connected to the same PBX use the same level of authorization. Thus, authorization levels assigned to the PBX generally might not accommodate authorization levels of the business at the level of a specific employee. For example, it may be desirable that a manager's station be set for higher calling privileges than his subordinates, or that a company president be assigned a privilege level that bypasses all call restrictions while the manager's and his subordinate employees' calling capabilities remain restricted. There is therefore a need for a method and apparatus that provides authorization at the individual station level that are behind a PBX.

A need therefore arises for determining independent authorization levels for calls with an Originating Station Number (OSN) associated with a long distance network via a primary rate interface within a VPN.

DETAILED DESCRIPTION

Figure 1:
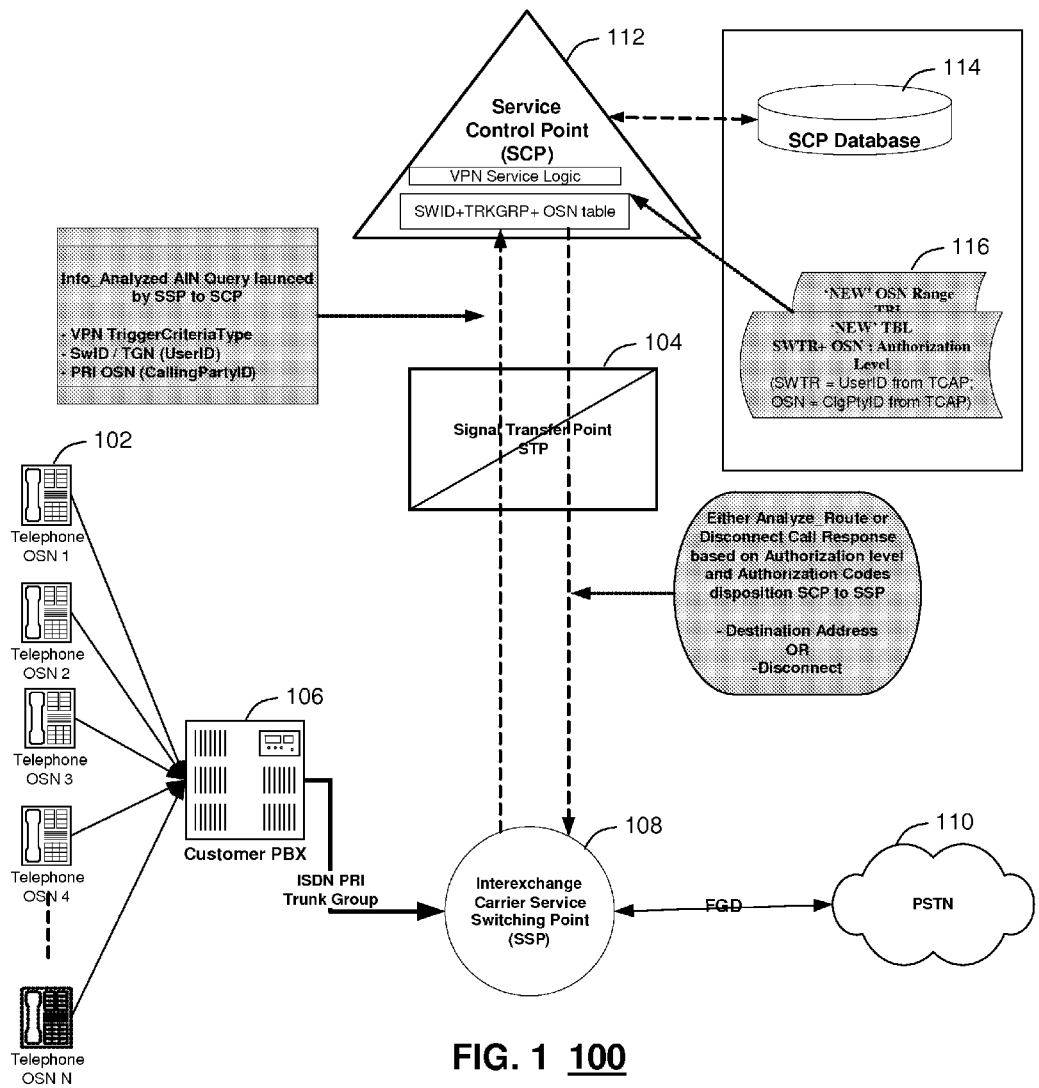
FIG. 1 illustrates a network view of a telecommunications network using a method for determining independent authorization levels for VPN PRI OSN.

Embodiments in accordance with the present disclosure provide a system and method of determining independent levels for VPN PRI OSN.

In a first embodiment of the present disclosure, a switch control point can have a controlling element that manages operations of a virtual private network (VPN) by validating that a call belongs to an ISDN access type of the VPN, retrieving from a look-up table a private number associated with a switch identifier, a trunk group identifier, and an Originating Station Number (OSN) corresponding to the call in response to determining that the call belongs to the ISDN access type of the VPN, and identifying a first authorization level associated with the private number.

The controlling element can be further associate one specific switch identifier and trunk group identifier value to one specific private number or associate many specific switch identifier and trunk group identifier values to one specific private number or associate a range of specific switch identifier and trunk group identifier values to one specific private number. The controlling element can further determine when a call originating from a dedicated access line (DAL) is marked with the ISDN access type via a look-up of a DAL's specific switch identifier and trunk group identifier access table. The controlling element can further assign an authorization level of a dedicated access line to the call when the access type of the call fails to be the ISDN access type.

The controlling element can also match a calling party identifier of an incoming transaction capabilities application part (TCAP) message to an OSN entry in the look-up table. If the calling party identifier of the TCAP message matches the OSN entry, then the controlling element can use a private number assigned to the OSN entry in the look-up table to get a new authorization level to be used. If no match exists between the calling party identifier of the TCAP message and the OSN entry, then the controlling element can use the authorization level of a direct access number's private number. The controlling element can prompt a caller to enter an authorization code if an initial authorization level is less than the new authorization level.

In a second embodiment of the present disclosure, a switch control point can have a controlling element that manages operations of a virtual private network by determining from a look-up table whether the call corresponds to a predetermined access type, associating a first private number to a specific switch identifier and trunk group identifier when the call does not correspond to the predetermined access type, and associating a first authorization level for the call derived from a second private number that matches the switch identifier and trunk group identifier, and an Originating Station Number (OSN) when the call corresponds to the predetermined access type.

The predetermined access type can be an ISDN access type. The Originating Station Number (OSN) can be coupled to a long distance network via a primary rate interface. The controlling element can also associate one specific switch identifier and trunk group identifier value to one specific private number or associate many specific switch identifier and trunk group identifier values to one specific private number. The controlling element can assign an authorization level of a dedicated access line to the call if the access type of the call fails to be the ISDN access type. The controlling element can match a calling party identifier of an incoming transaction capabilities application part (TCAP) message to an OSN entry in the look-up table.

In a third embodiment of the present disclosure, a computer-readable storage medium can have computer instructions for retrieving from a look-up table a private number associated with a switch identifier, a trunk group identifier, and an Originating Station Number (OSN) corresponding to a call belonging to a predetermined access type, and identifying a first authorization level associated with the private number.

The computer-readable storage medium can further include code for selecting an action based on a comparison of the first authorization level to the second authorization level required in the communication network which can include processing the call based on the comparison of the first and second authorization levels. Associating the first authorization level can further include combining a Service Switch Point identifier (SWID) and a Trunk Group Number identifier (TGN) to identify a VPN access type. As noted above, the predetermined access type can be an ISDN access type. Also note, a combination of Service Switch Point identifier (SWID) and Trunk Group Number (TGN) is further combined with the OSN to identify the first authorization level associated with the OSN.

Before continuing with the description of the embodiments, the following glossary will provide better clarity:

AIN Advanced Intelligent Network
CallingPartyID The out-of-band signaling parameter that contains PRI OSN
CPE Customer Premise Equipment, to which one end of a DAL is connected
DAL Dedicated Access Line
ISDN Integrated Services Digital Network
LD Long Distance, SBC Long Distance
ODR Origination Dependent Routing
OSN Originating Station Number
'plain DAL' DAL using in-band signaling
PRI Primary Rate Interface; ISDN equivalent of a T-1 circuit
PRI DAL DAL using out-of-band ISDN signaling
PRI OSN Calling (Origination) Station Number as provided in PRI out-of-band signaling
SBCLD SBC Long Distance
SCP Service Control Point, the AIN Services platform
SSP Service Switching Point, LD network switch
SwID Switch ID
Switch ID LD switch identifier to which one end of a DAL is connected
TCAP Transaction Capabilities Application Part, an ISDN application protocol used for messaging between the AIN SCP and the LD SSP
TGN Trunk Group Number
VPN Virtual Private Network, an AIN-based service
VoIP Voice over Internet protocol FIG. 1 illustrates an exemplary portion of a telecommunications network 10 in which an authorization for a call to proceed is determined according to the disclosed embodiments herein. Private Branch Exchange (PBX) 106 is linked to several telephone receivers, or originating stations 102 (OSN 1 through N). Each originating station has an originating station number (OSN) assigned to it, typically the ten-digit telephone number of the originating station. The PBX 106 exchanges signals with a Service Switching Point (SSP) 108. Typically, a PRI ISDN line (Integrated Services Digital Network) link connects the PBX and the SSP. Originating stations linked to the PBX share outside lines for making telephone calls external to the PBX. Although many PBXs can be associated with an SSP, only one SSP and one PBX are shown in FIG. 1 for illustrative purposes. The SSP further exchanges signals with the Public Switched Telephone Network, or PSTN 110, via a Feature Group D (FGD) trunk. The SSP, a service control point (SCP) and PBX utilize processors for execution and electronic storage such as disk and a relational database component for database storage.

Identification numbers are assigned to these network elements. For example, the ISDN link between PBX and SSP is identified by a Trunk Group Number (TGN). Also, each SSP has an associated Switch ID (SwID). These identification numbers can be transferred between network elements for verification purposes.

The SSP 108 queries a Service Control Point (SCP) 112 to obtain an instruction for how the call is to proceed. The query typically includes a VPN Trigger Criteria Type, which indicates a customized dialing plan applicable to the OSN, an SWTR (=SwitchID+Trunk Group Number) from the SSP in the form of a UserID parameter, and the OSN (Calling Party ID). The SWTR is a combination of the SwID and the TGN, and the two are combined at the SSP 108. In an exemplary embodiment of the present invention, the SwID is a four-digit number zero-padded from the left and the TGN is a four-digit number zero-padded from the left.

Since there are typically several operating SCPs or SCP pairs for redundancy, a Signal Transfer Point (STP) 104 routes the query to the appropriate SCP. Only one SCP is shown in FIG. 1 for illustrative purposes. The routing of the query can be performed using, for example, load balance or round robin techniques. Transaction Capabilities Application Part (TCAP) based protocol, an ISDN application protocol, can be used for messaging between the SCP and the SSP. At the SCP 112, a response to the query is determined by searching an SCP database 114 and the respective stored service logic. The SCP database comprises a VPN SWTR Access Table and at least one VPN Service Level Table (116). The embodiments herein modify an existing VPN SWTR Access Table to accept a new 'access type' value. Two existing values (e.g., DAL, ISDN) currently identify the DAL type in the Access Table. The two existing values differentiate a 'plain' DAL from a PRI DAL, respectively. The new DAL access type provided in this example of the invention is a third value (—e.g., OSNA—) that identifies a PRI DAL utilizing OSN authorization level functionality of the present embodiments. The new access type may be assigned to a DAL whether or not a new VPN Service Level table has been provided.

The VPN Service Level Table (116) can also associate to a specific authorization level (first authorization level) to one or more originating stations connected to the long distance (LD) network over a PRI DAL. The new VPN Service Level Table (e.g., OSNA PRI) comprises the following elements: a Switch ID (the LD switch identity to which the PRI DAL is connected), a TGN (Trunk Group Number within the Switch of the DAL), and an OSN (i.e. a telephone number). The OSN is generally established using an OSN Range (OSN start/end sequence) for assigning a common authorization level to multiple, consecutively-numbered stations as desired. The OSN or private number can be linked to a Private Number table which can include authorization levels.

VPN Service Logic within the SCP 112 operates on the query through the SWTR Access Table. The SWTR and OSN (116) are used to obtain the first authorization level from the VPN Service Level Table. The SWTR serves as a primary table key to the Service Level Tables that uniquely identifies a PRI Dedicated Access Line for all customers within the VPN Service. The response from the SCP to the SSP is based on the outcome of a comparison of first and second authorization levels or of a comparison of the second authorization level with an authorization level associated with entered authorization codes. The call can either be connected to the dialed number or blocked from completing to the dialed number.

Embodiments herein address independent assignment of an Authorization Level to an individual PRI Originating Station Number (OSN), for carrier provided and customer defined Voice Virtual Private Network (VPN). Authorization levels can work in concert with an Authorization feature herein and Authorization codes to first set an initial level of privilege (via assignment of an Authorization Level to a caller) and to then provide a means for the caller to increase that privilege level (by entering an appropriate Authorization Code with a higher associated Authorization Level) for the purpose of bypassing call screening restrictions.

Figure 2:
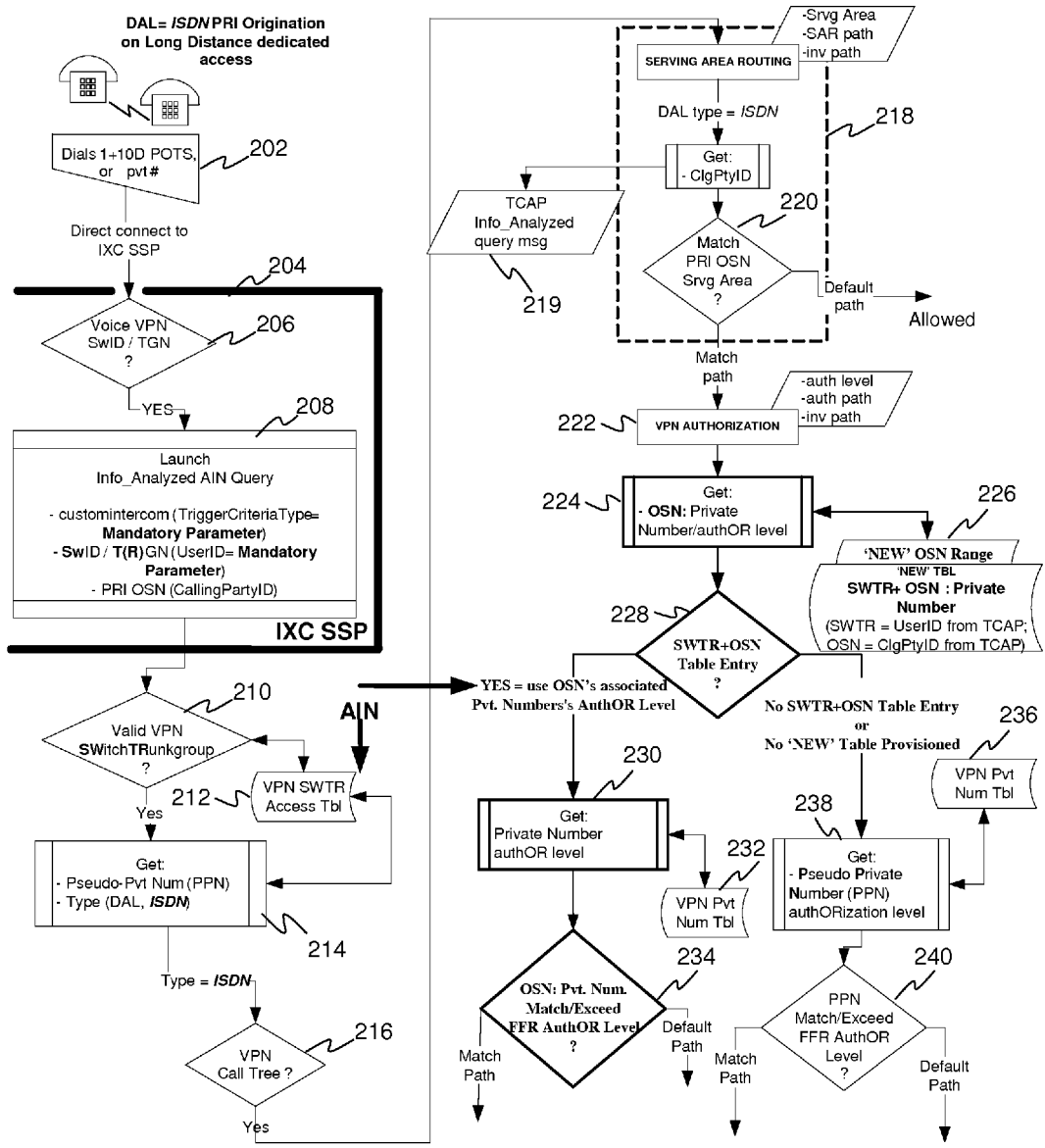
FIG. 2 is a flow chart depicting a method for determining independent authorization levels for VPN PRI OSN.

Embodiments herein generally will not alter either the function of the Authorization Codes or the assignment of Authorization Levels to those codes. It will provide new functionality for assigning the initial Authorization Level that applies to a particular class of VPN caller and for call processing when that caller encounters an Authorization feature instance. In particular, embodiments herein can establish a new VPN Service-level table 226 (as shown in FIG. 2) that allows association of a specific Authorization Level to one or more originating stations connected to the LD network via a PRI dedicated facility. Embodiments herein can also modify VPN call processing logic to take advantage of the preceding provisioning (table) enhancements. The existing SWTR (Switch ID+Trunk Group ID) Access Type=ISDN will invoke a look-up into the table(s) created.

Referring to call processing logic diagram of FIG. 2, a method 100 can include calls 202 into a Service Switching Point (SSP) 204 in a voice VPN where a decision block 206 determines if the call includes a switch ID (SW) and/or trunk group number (TGN). If the call includes the switch ID and trunk group number, further processing and analysis occurs at step 208. If the call includes a valid VPN SW and TGN at decision block 210 (as determined from comparison with data from a VPN switch ID+trunk group number (SWTR) access table 212, then a pseudo private number (PPN) and type is obtained for the call at step 214. If the type is ISDN and includes a call tree at decision block 216, then serving area routing (SAR) is performed at step 218 including determining if the PRI OSN serving area matches. If the path matches, then VPN authorization exists at step 222. Note, SAR logic can be an optional capability to logic that precedes the VPN Authorization logic.

In accordance with an embodiment, the method can get a private number and an authorization level for an OSN at step 224. A new VPN Service-level table (e.g., PriOsnAuthLevelVPN_PRI_OSN_PVT_NUM) 226 for the purpose of associating a specific Private Number to a specific 'SWTR+OSN' in order to provide the OSN with an Authorization Level by such association, will be established with the following provisionable elements including Switch ID (SW), Trunk Group (TR), Private Number, and OSN value(s) (plural implies sharing same Private Number) or range (start/end) of OSN values (that would share the same Private Number). A Private Number is required to be provisioned for each 'SWTR+OSN' entry in the above table(s). The Private Number(s) must exist in a Private Number table 232 or 236. If a SWTR-OSN entry exists at decision block 228, then the authorization level for the OSN's associated private number is used and the private number authorization level is obtained at step 230. If the private number authorization level matches or exceeds a prior authorization level at decision block 234, then the call proceeds down a matched path and otherwise goes down a default path. If no entry exists for a SWTR+OSN at decision block 228, then a PPN authorization level is obtained at step 238. If the PPN authorization level matches or exceeds a prior authorization level at decision block 240, then the call proceeds down a matched path and otherwise goes down a default path.

Note, the Switch ID (SW) and TGN (TR) will combine to form the table key (SWTR) that will uniquely identify a PRI DAL (PRIMARY RATE INTERFACE-DIRECT ACCESS LINE) across all customers within the VPN Service. All other table elements will be subordinate to the SWTR (multiple SWTR entries will each have their own subordinate elements). The new table (or tables) enable the association of 'SWTR+OSN' to a Private Number in any of the following ways: one 'SWTR+OSN' value to one Private Number or many 'SWTR+OSN' values to one Private Number or a range of 'SWTR+OSN' values to one Private Number. Also, SWTR Access type=ISDN will not require OSN/Private Number entries in the new table(s). Conversely, the new table(s) may be provisioned without any SWTR Access type=ISDN.

As mentioned earlier, existing SWTR (Switch ID+Trunk Group ID) Access Type=ISDN will invoke a look-up into the table(s) created. The table lookup will attempt to match originating OSN to a table entry. If a match is found, the associated Private Number and it's originating characteristics, including it's Authorization Level, will be available for use in all existing originating Private Number call processing logic in the same manner as currently exists for a Private Number associated to VPN Switched Access. If no match found, existing call processing logic for SWTR Access Type=ISDN will prevail.

Currently, the SWTR Access table is used to determine VPN membership of a DAL, identify the type of DAL (—currently, two existing values (e.g., DAL and ISDN) differentiate 'plain' DAL from PRI DAL, respectively, and assign a DAL-level private number (in yet another table, the private number is associated to an Authorization Level that will be applied to all customer stations connected to LD via that DAL). These current functionalities do not necessarily need change to change in accordance with the embodiments.

If no Authorization feature is encountered during a call, the Authorization Level of the caller, no matter how assigned, will have no applicability during call processing (existing functionality). Multiple Authorization features may be encountered during a single call, and each instance of the Authorization feature will have its own Authorization Level independent of any other instance (current functionality). The call processing logic described in accordance with the embodiments herein can apply each time an Authorization feature is encountered.

VPN call processing logic within the AIN SCP can be enhanced in the following manner. When an Authorization feature is encountered during a VPN DAL-originated call, a determination if a call is originating from a DAL marked with the access type (e.g., ISDN) via a 'look-up' of the originating DAL's SwID/TGN in the SWTR Access table can be done. If not an ISDN access type, Authorization Level of the private number assigned to the DAL will be used, initially, by the Authorization feature. If the access type is ISDN, then a 'look-up' in the new table can be performed to attempt a match of the CallingPartyID of incoming TCAP message to an OSN entry in the new table. If no match, Authorization Level of the DAL's private number will be used, initially, by the Authorization feature. If a match exists, the Private Number assigned to the OSN is used in the new table to get the Authorization Level that will be used, initially, by the Authorization feature. From this point on, existing functionality prevails regarding the Authorization feature call processing logic. Namely, if the initial Authorization Level meets or exceeds that assigned to the Authorization feature instance, the call screening feature restriction immediately preceding the Authorization feature will be bypassed without any prompts to the caller for Authorization Code entry. If the initial Authorization Level is less than that of the Authorization feature instance, the caller will be prompted to enter an Authorization Code. For all other VPN features (e.g., ODR) encountered during the call, preceding or following an Authorization feature, call processing logic will exhibit the same functionality as applies to the existing ISDN access type.

Currently, for all DAL facility types, an Authorization Level is assigned to an individual facility that applies to any and all stations sitting behind the CPE that is connected to the customer-end of the facility.

PRI ISDN signaling, along with the embodiments herein, allows each individual station to have its own Authorization Level. For example, a manager's station can be set for higher calling privileges than his or her subordinates. The company president can be assigned a privilege level that bypasses all call restrictions while the manager's calling capabilities and his subordinate employees' calling capabilities remain restricted. The embodiments herein can allow VPN customers or users more flexibility in controlling the calling characteristics of their employees through the assignment of Authorization Levels specific to particular stations.

Figure 3:
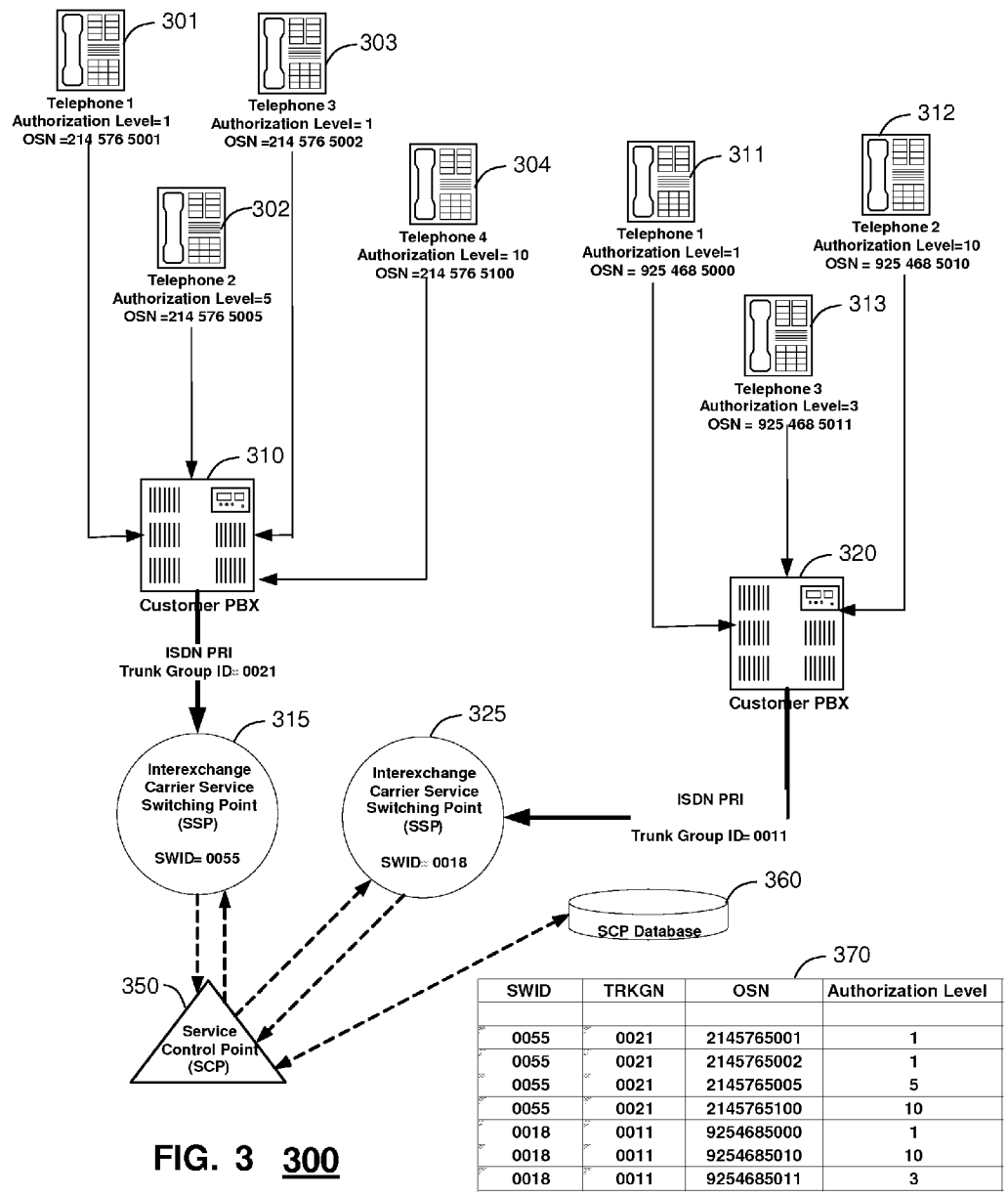
FIG. 3 is a network logic diagram of a telecommunications network using a method for determining independent authorization levels for VPN PRI OSN.

FIG. 3 illustrates network logic or a system 300 in accordance with an embodiment herein. The system 300 can include a plurality of originating stations 301,302,303, and 304 coupled to a private branch exchange (PBX) 310 and another plurality of originating stations 311, 312 and 313 coupled to another private branch exchange 320. As discussed above, each originating station has an originating station number (OSN) assigned to it, typically the ten-digit telephone number of the originating station. The PBX 310 exchanges signals with a Service Switching Point (SSP) 315 and the PBX 320 exchanges signals with an SSP 325. Identification numbers are assigned to these network elements. For example, the ISDN link between a PBX and an SSP is identified by a Trunk Group Number (TGN). Also, each SSP has an associated Switch ID (SwID). These identification numbers can be transferred between network elements for verification purposes.

The SSPs 315 and 325 can query a Service Control Point (SCP) 350 to obtain an instruction for how the call is to proceed. The query typically includes a VPN Trigger Criteria Type, which indicates a customized dialing plan applicable to the OSN, an SWTR (=SwitchID+Trunk Group Number) from the SSP in the form of a UserID parameter, and the OSN (Calling Party ID). The SWTR is a combination of the SwID and the TGN, and the two are combined at the SSP. In an exemplary embodiment of the present invention, the SwID is a four-digit number zero-padded from the left and the TGN is a four-digit number zero-padded from the left (as shown in Table 370). The SCP 350 can access information from an SCP database 360 having a conglomeration of data. The new VPN Service Level Table 370 (e.g., OSNA PRI) thus comprises the following elements: a Switch ID (the LD switch identity to which the PRI DAL is connected), a TGN (Trunk Group Number within the Switch of the DAL), and an OSN (i.e. a telephone number). The OSN is generally established using an OSN Range (OSN start/end sequence) for assigning a common authorization level to multiple, consecutively-numbered stations as desired. The OSN or private number can be linked to a Private Number table which can include authorization levels.

Figure 4:
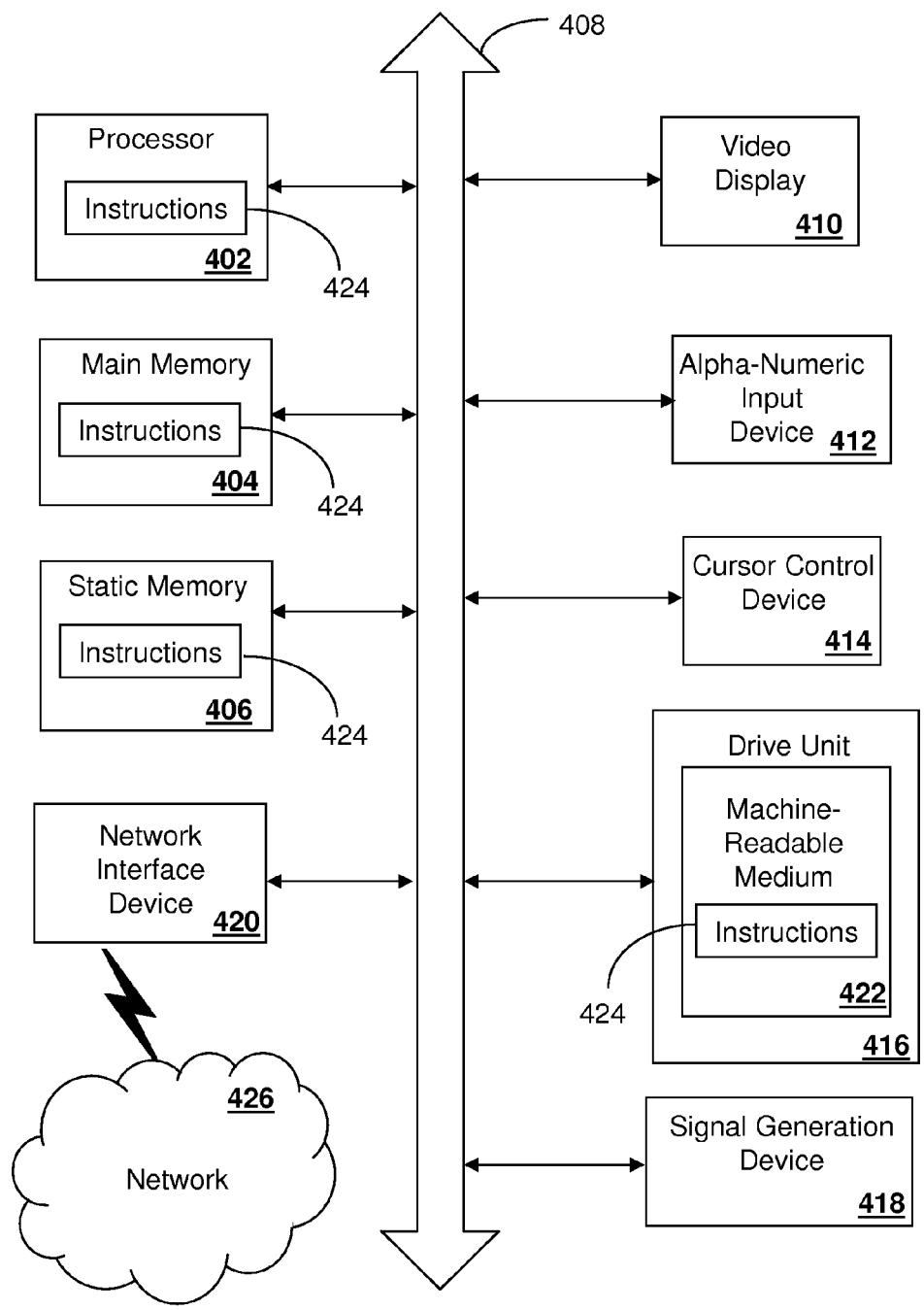
FIG. 4 depicts an exemplary diagrammatic representation of a system and machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform anyone or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform anyone or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 326 can send or receive voice, video or data, and to communicate over the network 326 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform anyone or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium as listed herein, and including art-recognized equivalents and successor physical media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining whether a call originated from an originating station associated with a virtual private network, the call originating via a private branch exchange associated with the virtual private network by a first user of a plurality of users associated with the virtual private network;
   querying, with a service switching point, a private-number table based on a switch identifier representing the service switching point, a trunk group identifier representing the private branch exchange, and an originating station identifier representing the originating station to obtain a private number assigned to the first user;
   matching a calling party identifier of an incoming transaction capabilities application part message to an originating station identifier entry in the private-number table;
   identifying an authorization level associated with the private number;
   comparing the authorization level to a threshold to determine whether to prompt the first user to enter an authorization code; and
   providing the authorization level associated with the private number to the service switching point, the service switching point to process the call according to the authorization level.

2. The method of claim 1, wherein the private-number table is to associate a specific switch identifier and a specific trunk group identifier to a specific private number.

3. The method of claim 1, wherein the private-number table is to associate a plurality of switch identifiers and a plurality of trunk group identifiers to a specific private number.

4. The method of claim 1, wherein the private-number table is to associate a range of specific switch identifiers and trunk group identifiers to a specific private number.

5. A service control point comprising:
   a memory to store a private-number table; and
   a processor to control a call originated via an originating station of a private branch exchange by a first user of a plurality of users associated with a virtual private network, by:
      accessing the private-number table based on a switch identifier representing a service switching point, a trunk group identifier representing the private branch exchange, and an originating station number representing the originating station to obtain a private number assigned to the first user;
      matching a calling party identifier of an incoming transaction capabilities application part message to an originating station identifier entry in the private-number table;
      identifying an authorization level associated with the private number;
      comparing the authorization level to a threshold to determine whether to prompt the first user to enter an authorization code; and
      providing the authorization level associated with the private number to the service switching point, the service switching point to process the call according to the authorization level.

6. The service control point of claim 5, wherein the private-number table is to associate a specific switch identifier and a specific trunk group identifier to a specific private number.

7. The service control point of claim 5, wherein the private-number table is to associate a plurality of switch identifiers and a plurality of trunk group identifiers to a specific private number.

8. The service control point of claim 5, wherein the private-number table is to associate a range of specific switch identifiers and trunk group identifiers to a specific private number.

9. A tangible article of manufacture storing machine-readable instructions that, when executed, cause a processor to at least:
   determine whether a call originated from an originating station associated with a virtual private network, the call originating via a private branch exchange associated with the virtual private network by a first user of a plurality of users associated with the virtual private network, the originating station being associated with the first user;
   query, with a service switching point, a private-number table based on a switch identifier representing the service switching point, a trunk group identifier representing the private branch exchange, and an originating station identifier representing the originating station to obtain a private number assigned to the first user;
   match a calling party identifier of an incoming transaction capabilities application part message to an originating station identifier entry in the private-number table;
   identify an authorization level associated with the private number;
   compare the authorization level to a threshold to determine whether to prompt the first user to enter an authorization code; and
   provide the authorization level associated with the private number to the service switching point, the service switching point to process the call according to the authorization level.

10. The article of manufacture of claim 9, wherein the private-number table is to associate a specific switch identifier and a specific trunk group identifier to a specific private number.

11. The article of manufacture of claim 9, wherein the private-number table is to associate a plurality of switch identifiers and a plurality of trunk group identifiers to a specific private number.

12. The article of manufacture of claim 9, wherein the private-number table is to associate a range of specific switch identifiers and trunk group identifiers to a specific private number.

* * * * *